(12) United States Patent
Lee

(10) Patent No.: US 10,061,502 B2
(45) Date of Patent: Aug. 28, 2018

(54) ELECTRONIC DEVICE

(71) Applicant: LG ELECTRONICS INC., Seoul (KR)

(72) Inventor: Gunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 322 days.

(21) Appl. No.: 15/031,447

(22) PCT Filed: Jan. 29, 2014

(86) PCT No.: PCT/KR2014/000843
§ 371 (c)(1),
(2) Date: Apr. 22, 2016

(87) PCT Pub. No.: WO2015/115684
PCT Pub. Date: Aug. 6, 2015

(65) Prior Publication Data
US 2016/0266783 A1    Sep. 15, 2016

(51) Int. Cl.
*G06F 3/048* (2013.01)
*G06F 3/0484* (2013.01)
*G06Q 10/10* (2012.01)
*H04M 1/725* (2006.01)
*G06F 3/0488* (2013.01)

(52) U.S. Cl.
CPC ........ *G06F 3/04847* (2013.01); *G06F 3/0488* (2013.01); *G06Q 10/107* (2013.01); *H04M 1/72547* (2013.01); *H04M 1/72555* (2013.01)

(58) Field of Classification Search
CPC .......... G06F 3/048; G06F 15/16; G06F 17/00; G06F 3/04847; G06F 3/0488; H04L 12/58
See application file for complete search history.

(56) References Cited

U.S. PATENT DOCUMENTS

| | | | |
|---|---|---|---|
| 9,813,260 B1 * | 11/2017 | Morgan | H04L 12/581 |
| 2007/0271340 A1 * | 11/2007 | Goodman | G06Q 10/107 709/206 |
| 2011/0231745 A1 * | 9/2011 | Levesque | G06F 17/30041 715/202 |
| 2013/0030979 A1 | 1/2013 | Annunziata et al. | |
| 2013/0275525 A1 | 10/2013 | Molina et al. | |

FOREIGN PATENT DOCUMENTS

| | | |
|---|---|---|
| KR | 100687203 | 2/2007 |
| KR | 101056471 | 8/2011 |

OTHER PUBLICATIONS

PCT International Application No. PCT/KR2014/000843, International Search Report dated Oct. 27, 2014, 2 pages.

* cited by examiner

*Primary Examiner* — Rashawn N Tillery
(74) *Attorney, Agent, or Firm* — Lee, Hong, Degerman, Kang & Waimey

(57) ABSTRACT

The present invention relates to an electronic device that may provide a slideshow function to a drafted message, in addition to merely drafting, transmitting, receiving, and checking a message.

14 Claims, 10 Drawing Sheets

[Fig. 1]
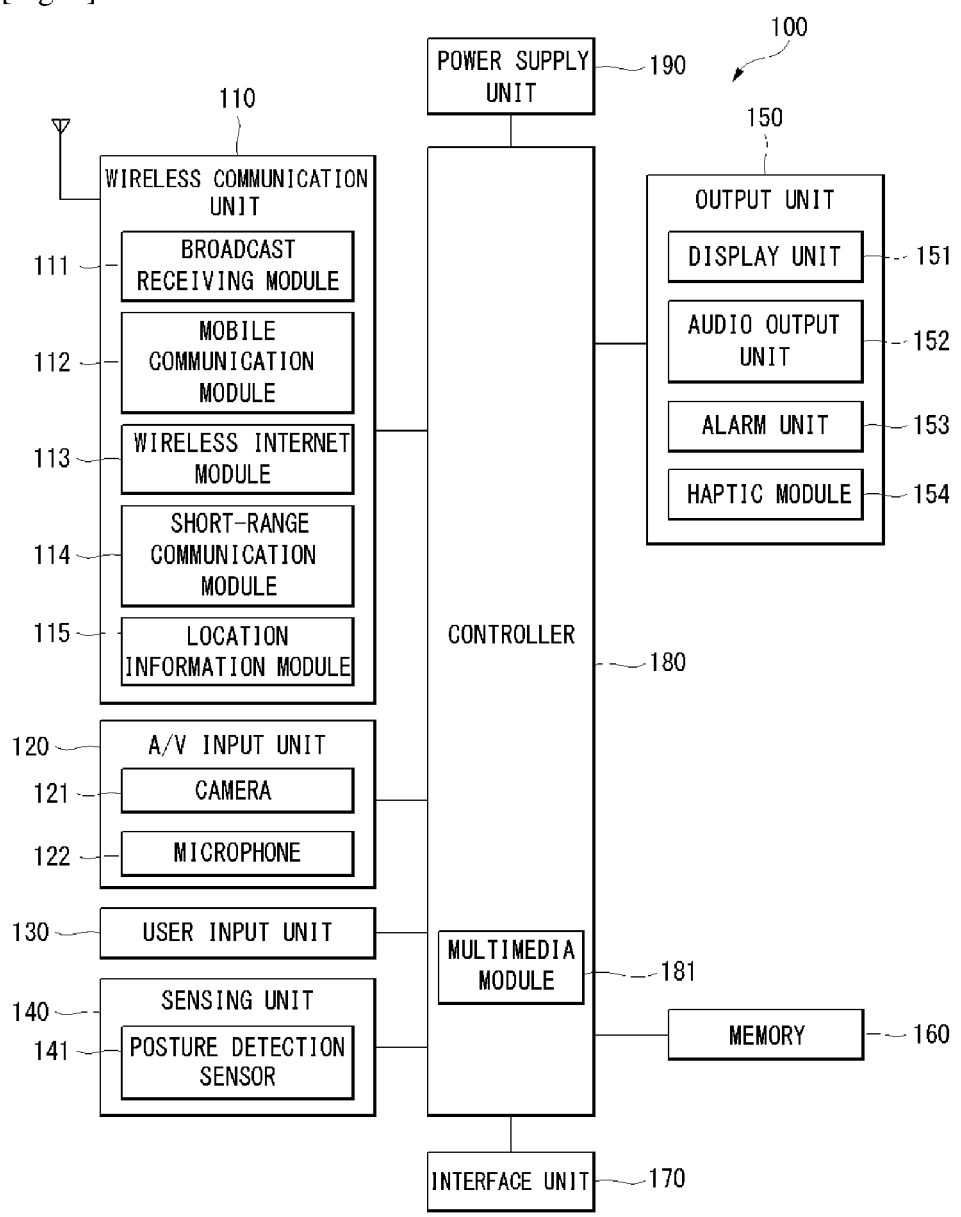

[Fig. 2]
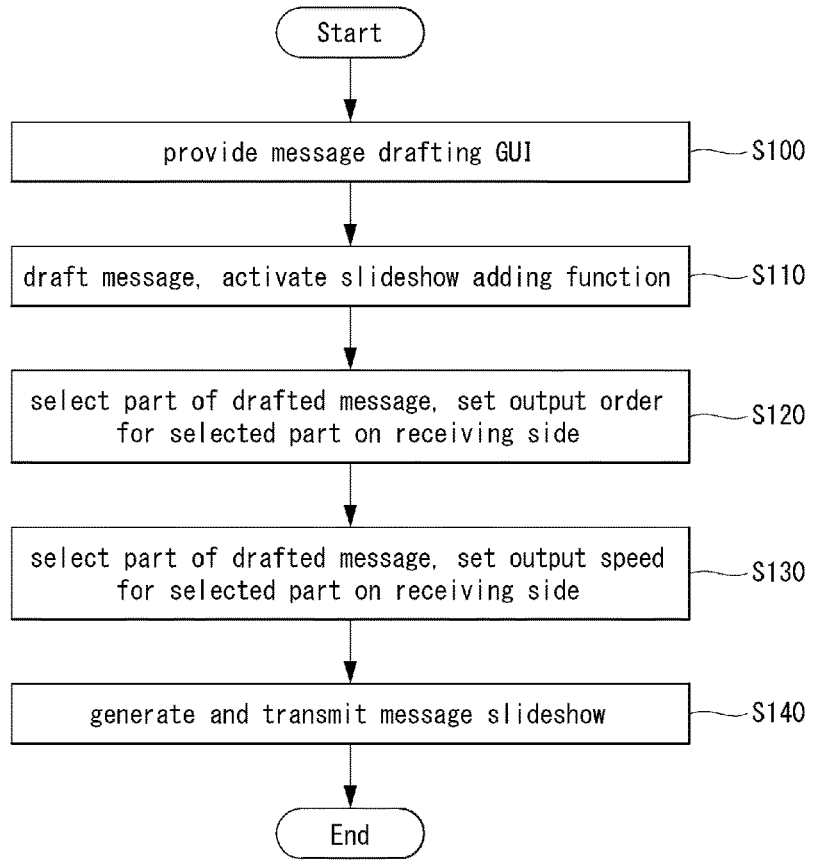
[Fig. 3]
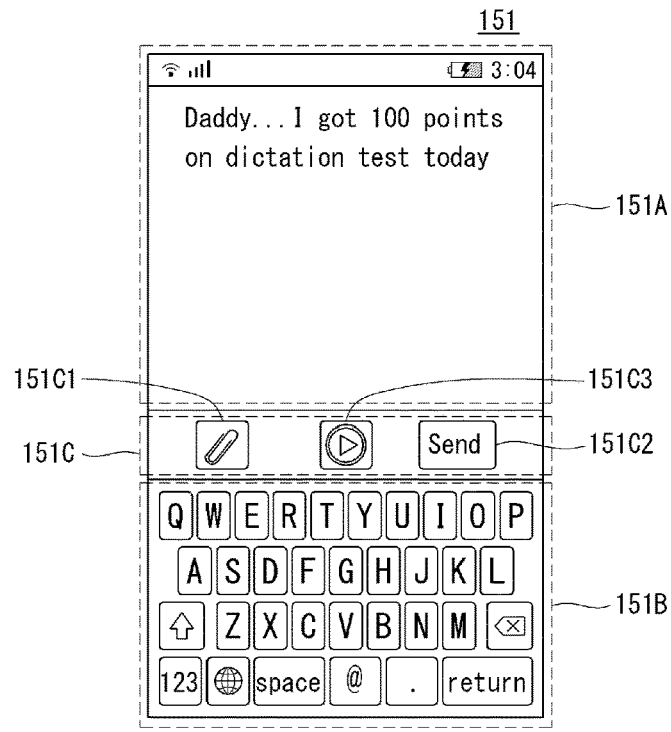

[Fig. 4]
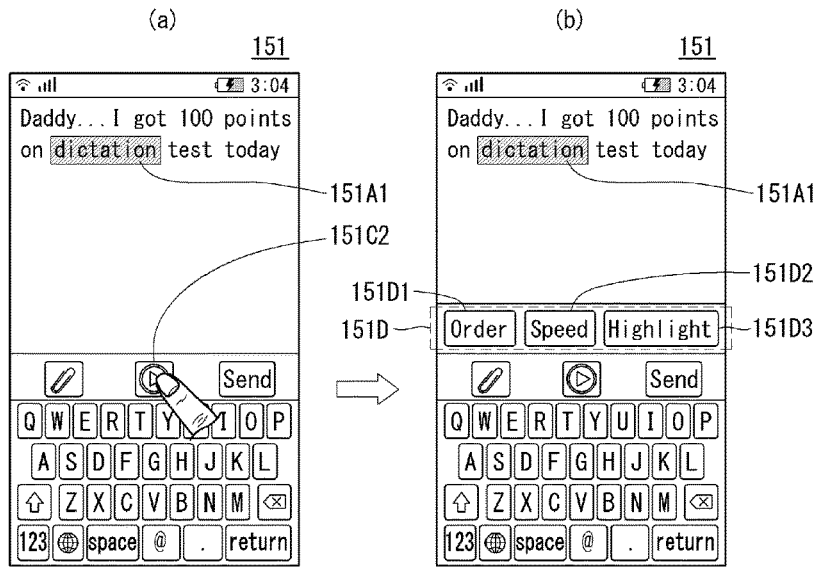
[Fig. 5]
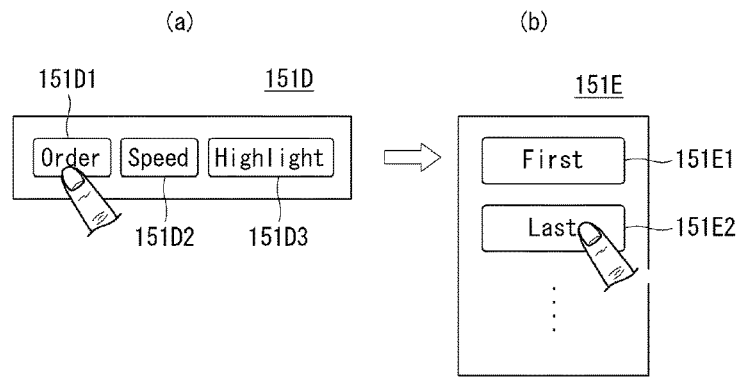
[Fig. 6]
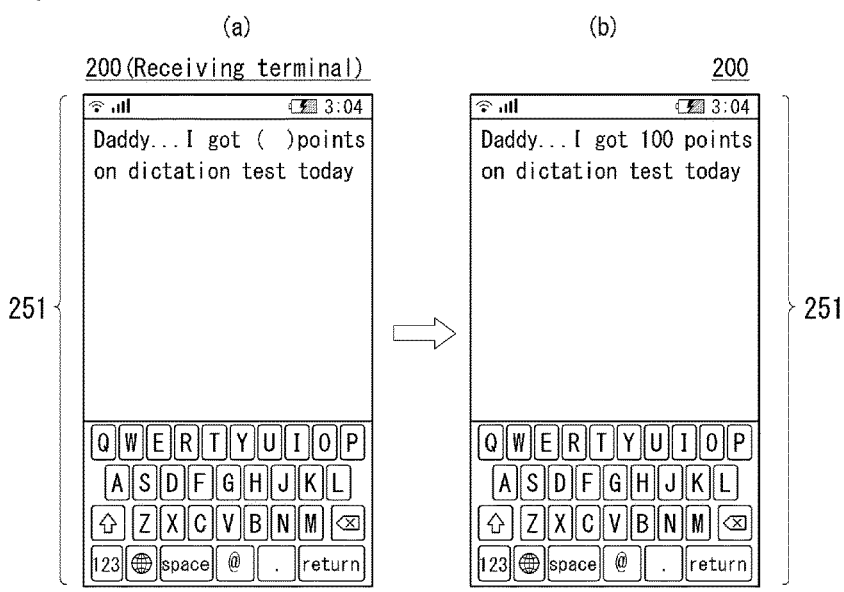

[Fig. 7]
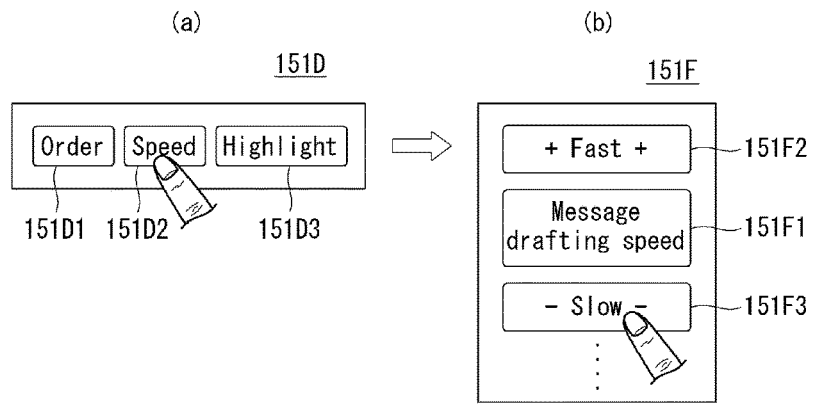
[Fig. 8]
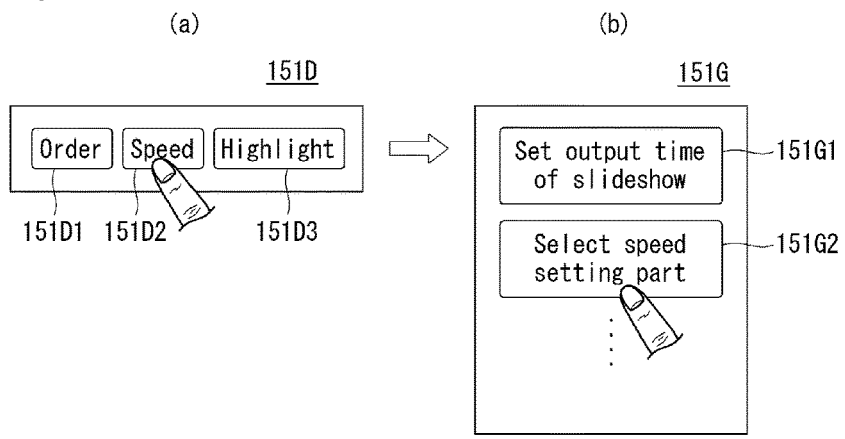
[Fig. 9]
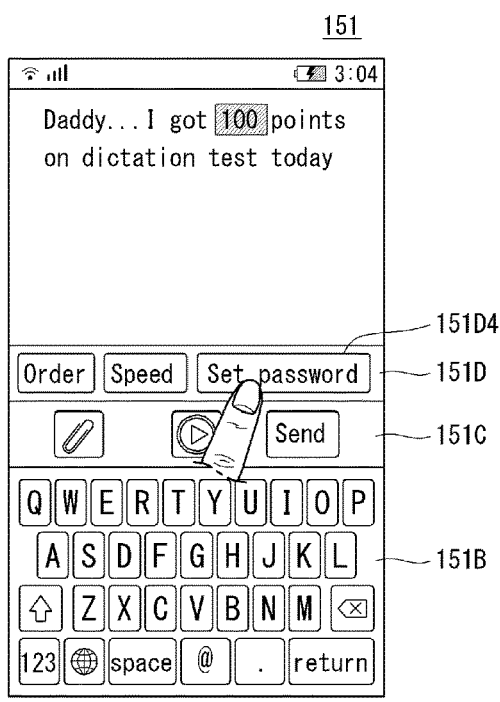

[Fig. 10]
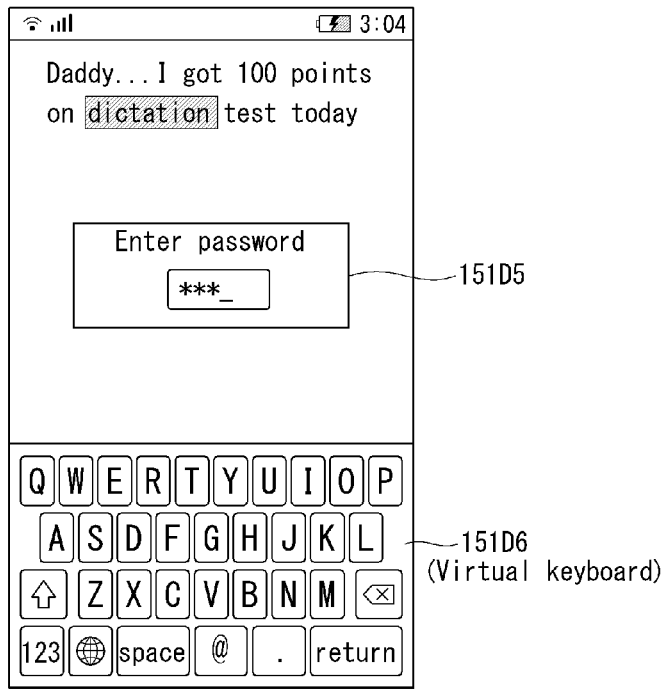
[Fig. 11]
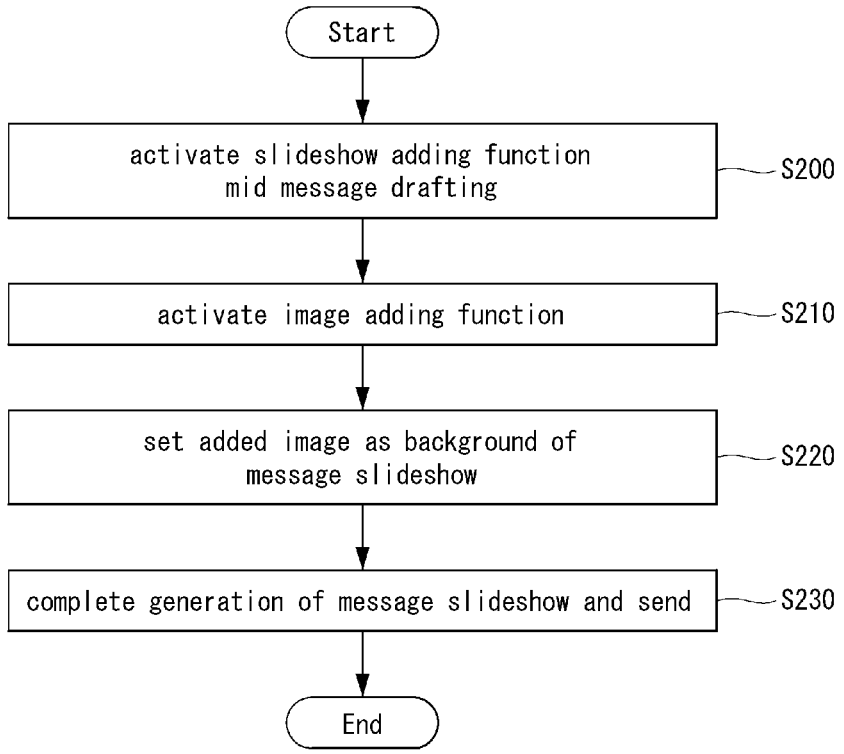

[Fig. 12]
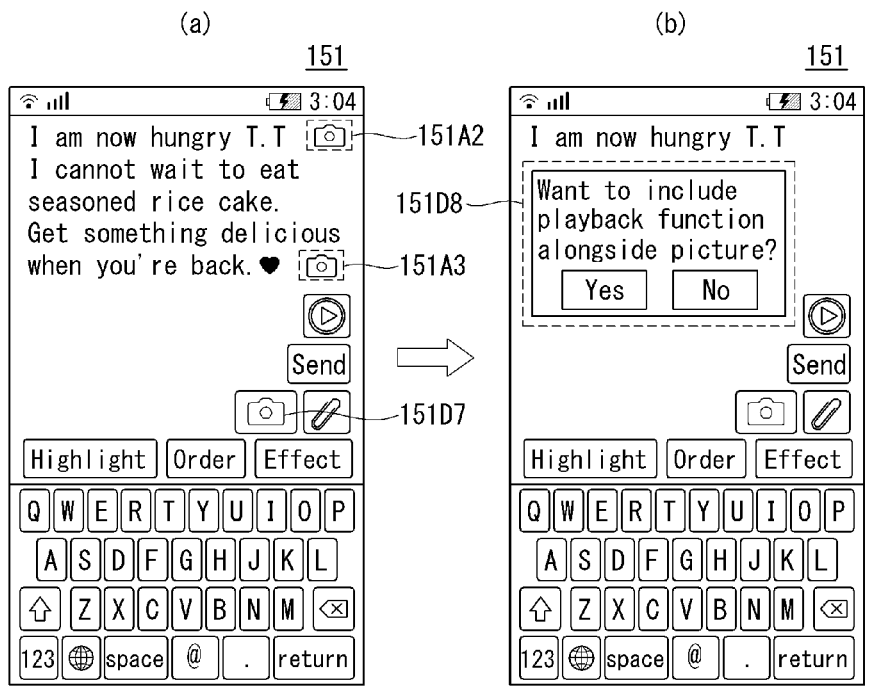
[Fig. 13]
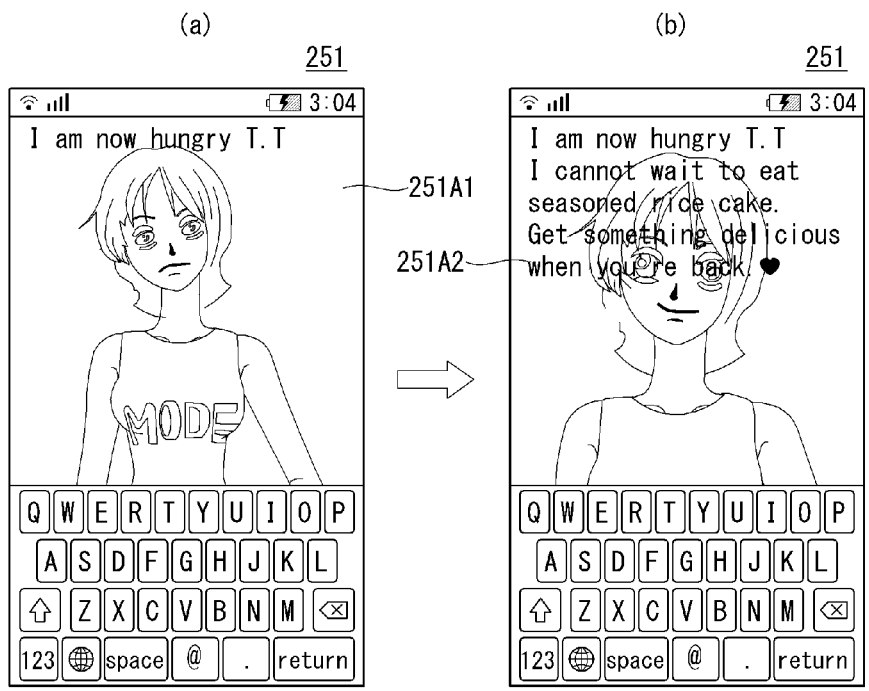

[Fig. 14]
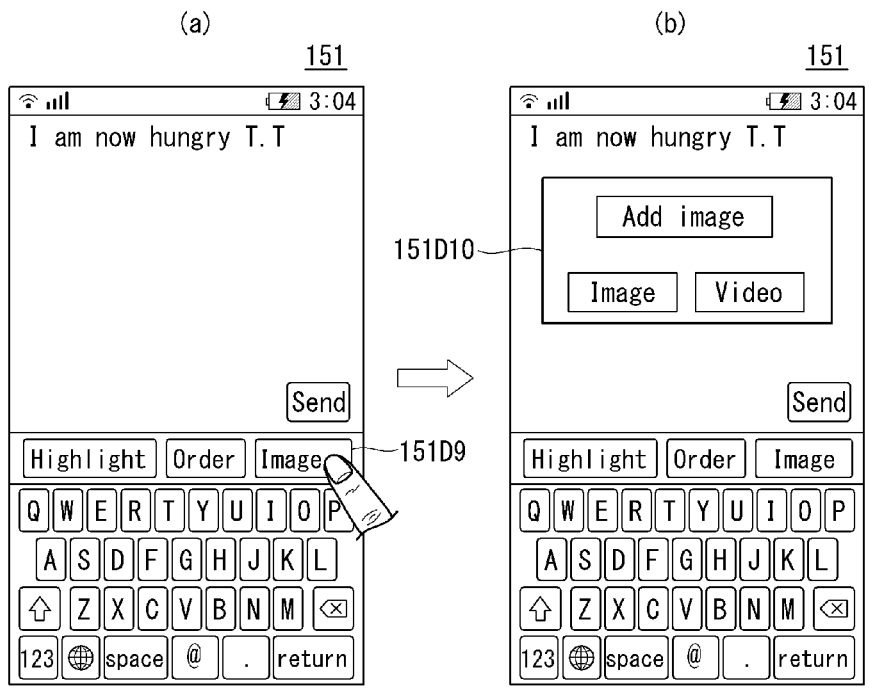
[Fig. 15]
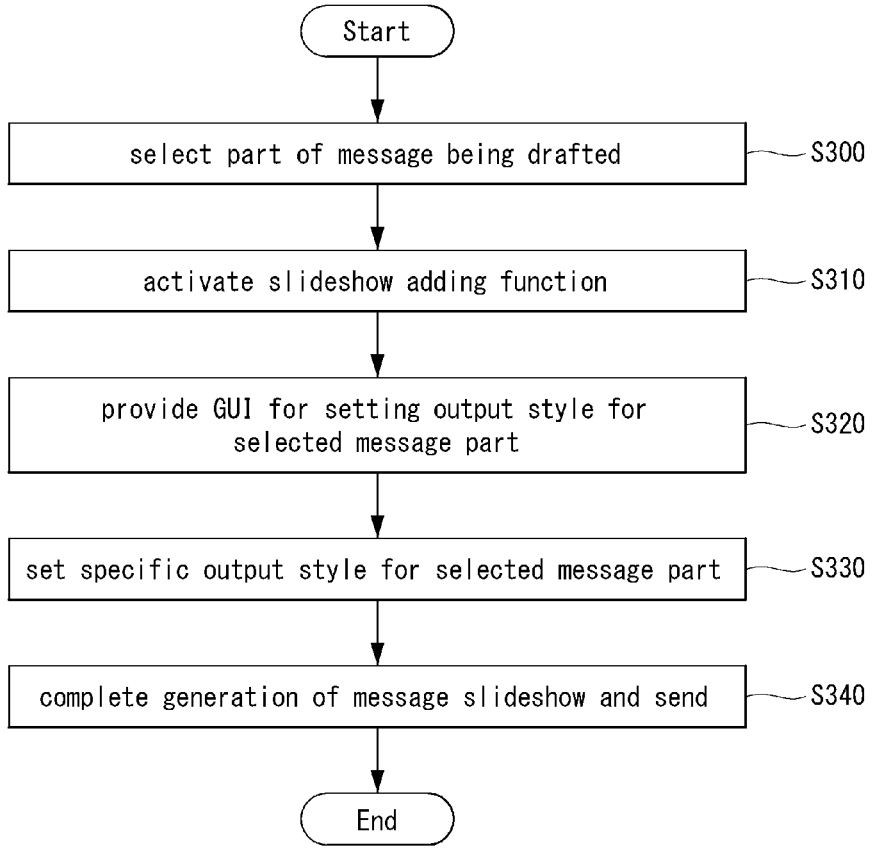

[Fig. 16]
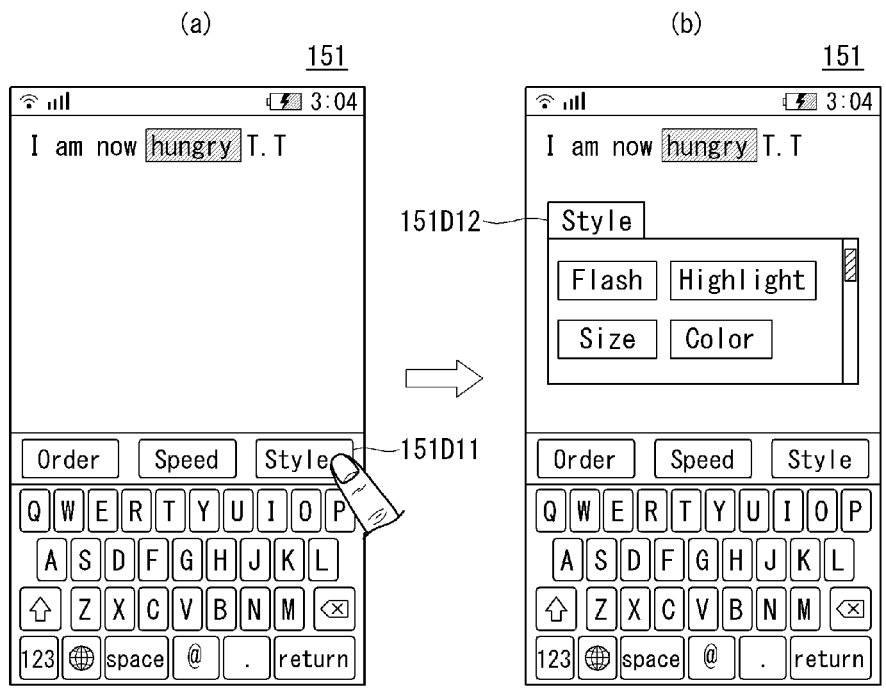
[Fig. 17]
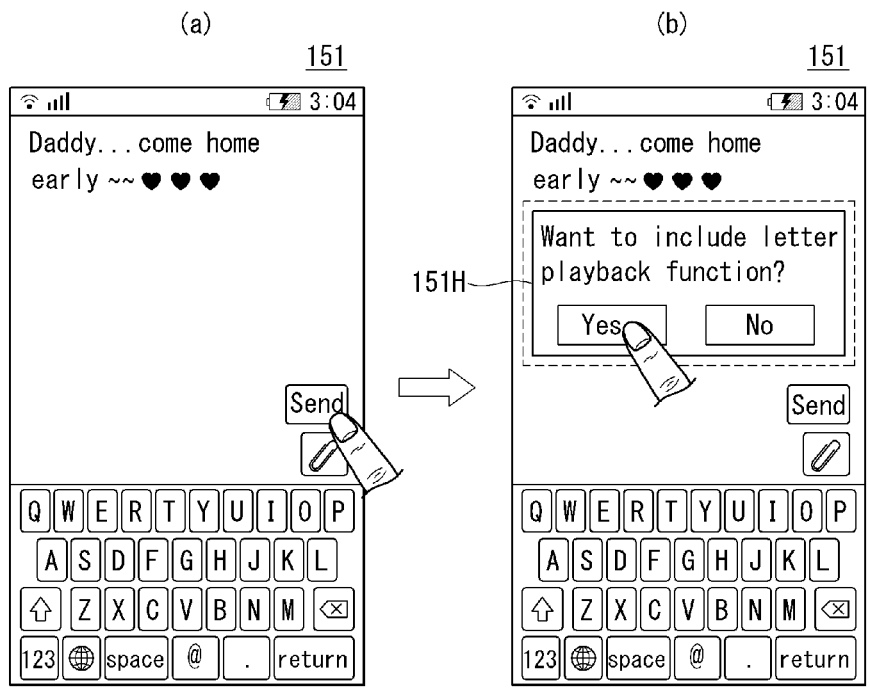

[Fig. 18]
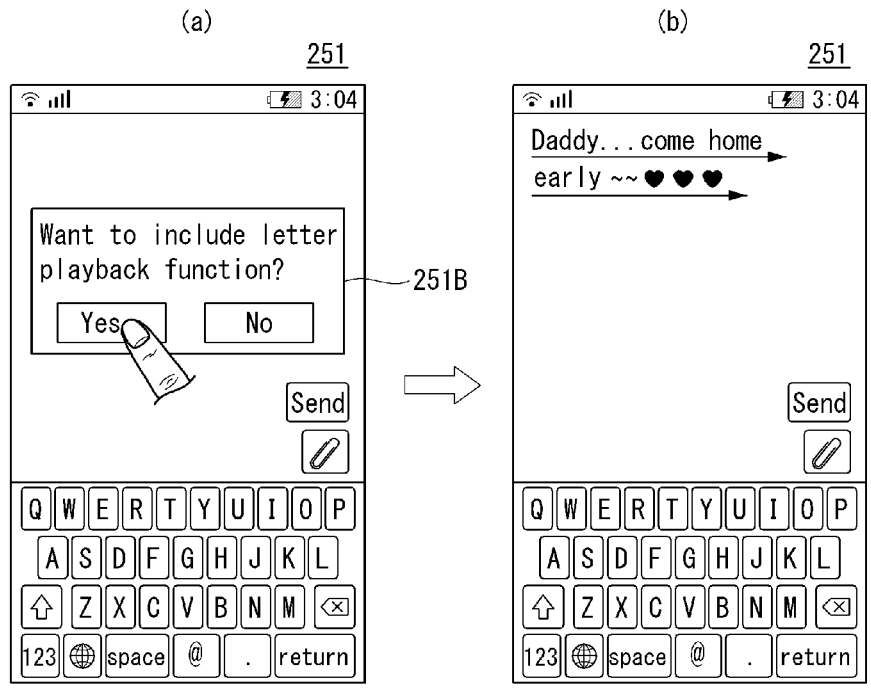
[Fig. 19]
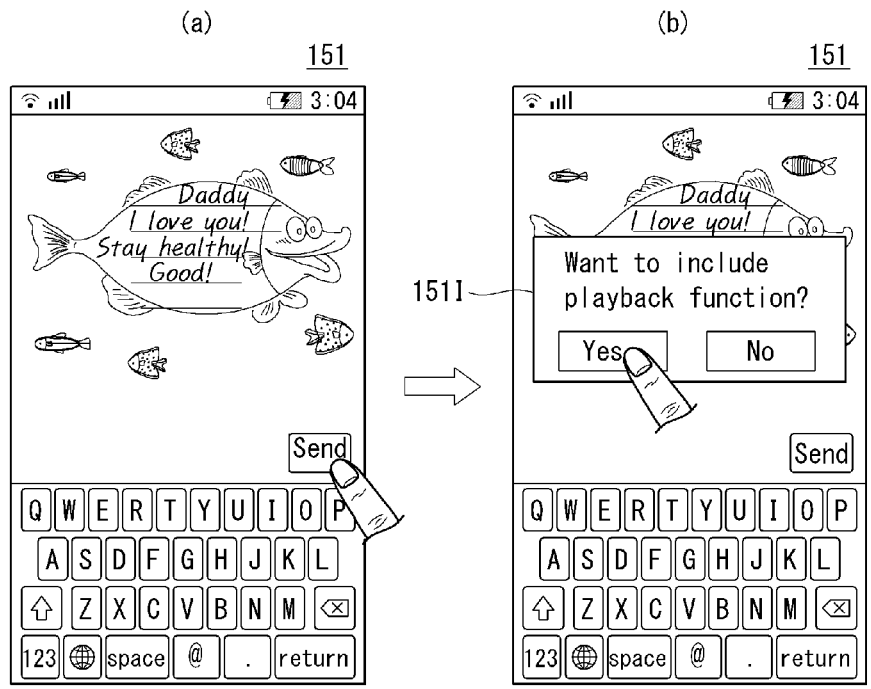

[Fig. 20]
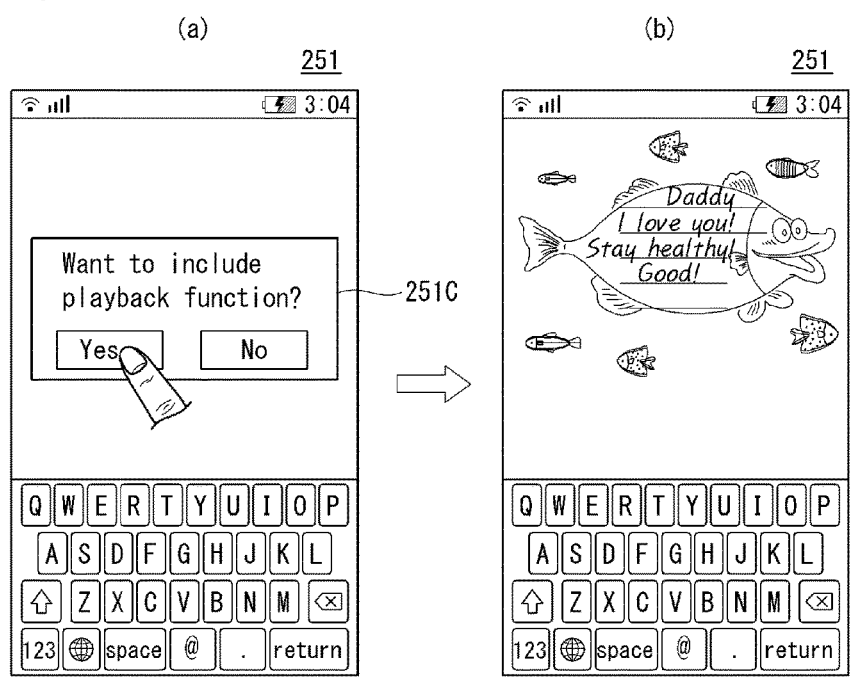

ELECTRONIC DEVICE

CROSS-REFERENCE TO RELATED APPLICATIONS

This application is the National Stage filing under 35 U.S.C. 371 of International Application No. PCT/KR2014/000843, filed on Jan. 29, 2014, the contents of which are all hereby incorporated by reference herein in its entirety.

TECHNICAL FIELD

The present invention relates to electronic devices, and more specifically, to electronic devices that may configure a slideshow function in a prepared message and methods of driving the same.

BACKGROUND ART

Mobile terminals, such as personal computers, laptop computers, mobile phones, or smart phones, with their functions diversified, have been evolving into multimedia players having multiple functions including playback of music or video files, game play, and reception of broadcast.

In order to support and add the functions of such electronic devices, enhancement in the structural and/or software part of the electronic devices may be taken into consideration. Recently, as mobile terminals or other various electronic devices are rendered to provide diverse and complicated functions, the structure of their menus is complicated as well.

A variety of message applications such as SMS (Short Message Service), MMS (Multimedia Message Service), IMS (Instant Message Service), or e-mail services, are being in use through such electronic devices, and demand for the applications is drastically on the rise. However, such message schemes can simply deliver or display drafted messages.

DISCLOSURE OF INVENTION

Technical Problem

An object of the present invention is to provide an electronic device that may deliver a user's feel that is acquired while drafting a message, as well as merely drafting a message and checking the drafted message, i.e., that may offer a slideshow function to a drafted message, and a method of driving the electronic device.

The objects of the present invention are not limited thereto, and other unmentioned objects can be clearly understood by those of ordinary skill in the art from the following detailed description.

Solution to Problem

To obtain the above objects, according to an embodiment of the present invention, an electronic device comprises a communication unit; a display unit configured to provide a message drafting GUI (Graphic User Interface) that enables drafting a message and adding a slideshow function to the drafted message; and a controller configured to generate a message slideshow with an output order and an output speed on at least a part of the drafted message on a receiving side based on manipulation of the message drafting GUI and transmit the message slideshow to the receiving side through the communication unit.

The controller may set a different output speed of the message slideshow on the receiving side for each part selected in the drafted message based on the manipulation of the message drafting GUI.

The message drafting GUI may include a GUI that enables increasing/decreasing an output speed of the drafted message on the receiving side based on a drafting speed of the drafted message.

The message drafting GUI may include a GUI for setting a time when the slideshow is output at the receiving side.

The controller may set an image added while drafting the message as a background of the message slideshow.

The controller may set the added image as a background of the message slideshow from a time when the image is added to a time when another image is added to the message while the message is drafted.

The controller may perform image capturing when a predetermined condition is met while the message is drafted and sets the captured image as a background of the message slideshow.

In case an image is added while the message is drafted, the controller may constitute the added image as part of the message slideshow. In case the message slideshow is output at the receiving side, the added image may be output as part of the message slideshow at the time when the image is added.

The message drafting GUI may further include a GUI for setting an output style for the selected part of the drafted message on the receiving side.

To achieve the above objects, a method of controlling an electronic device, the method comprises providing a message drafting GUI (Graphic User Interface) that enables drafting a message and adding a slideshow function to the drafted message; generating a message slideshow with an output order and an output speed on at least a part of the drafted message on a receiving side based on manipulation of the message drafting GUI; and transmitting the message slideshow to the receiving side through the communication unit.

The above-described method of driving an electronic device according to an embodiment of the present invention may be implemented by executing a computer program for realizing a method of driving a electronic device stored in a computer-readable recording medium.

Advantageous Effects of Invention

By using an electronic device and a method of driving the electronic device according to the present invention, in addition to mere drafting and checking of a message, the drafted message may be provided with a slideshow function, thereby able to deliver the drafter's feel or sentiment that is acquired while drafting the message.

BRIEF DESCRIPTION OF DRAWINGS

The accompany drawings, which are included to provide a further understanding of this document and are incorporated on and constitute a part of this specification illustrate embodiments of this document and together with the description serve to explain the principles of this document.

FIG. 1 is a block diagram illustrating an electronic device according to an embodiment of the present invention.

FIG. 2 is a flowchart illustrating an example of a method of driving an electronic device according to the present invention.

FIG. 3 shows an example of a message drafting GUI provided from an electronic device according to the present invention.

FIG. 4 shows an example in which a slideshow adding function is activated in an electronic device according to the present invention.

FIG. 5 shows an example of a GUI for setting an output order on the receiving side among slideshow adding functions provided by an electronic device according to the present invention.

FIG. 6 shows an example in which a message slideshow with an output order for part of a drafted message set, generated in an electronic device according to the present invention is output by a receiving terminal.

FIGS. 7 and 8 show example GUIs that are provided to generate a message slideshow which has set an output speed of a message drafted in an electronic device according to the present invention.

FIGS. 9 and 10 show an example GUI 151D4 for setting a password for outputting, on the receiving side, part of a message drafted in an electronic device according to the present invention.

FIG. 11 is a flowchart illustrating another example method of driving an electronic device according to the present invention.

FIG. 12 shows an example in which an image-added message slideshow is generated by a method of driving an electronic device as shown in FIG. 11.

FIG. 13 shows an example in which a message slideshow generated by a method of driving an electronic device as shown in FIG. 11 is output by a receiving terminal.

FIG. 14 shows another example where an image is added to a message that is being drafted by a method of driving an electronic device as shown in FIG. 12.

FIG. 15 is a flowchart illustrating another example method of driving an electronic device according to the present invention.

FIG. 16 shows an example of setting an output style for part of a message selected by a method of driving an electronic device as shown in FIG. 15.

FIGS. 17 and 18 show an example where a message slideshow is generated by an electronic device according to the present invention and is output by a receiving terminal.

FIGS. 19 and 20 show another example where a message slideshow is generated by an electronic device according to the present invention and is output through a receiving terminal.

MODE FOR THE INVENTION

The objectives, characteristics, and advantages of the present invention will be more clearly understood from the following descriptions related to appended drawings. Hereinafter, preferred embodiments according to the present invention will be described in more detail with reference to appended drawings. The same reference number denotes the same constituting element throughout the entire document. Also, if it is determined that functions known to the public related to the present invention or a specific descriptions about structure of the present invention unnecessarily cause ambiguity in understanding technical principles of the present invention, the corresponding descriptions will be omitted.

Hereinafter, a electronic device according to embodiments of the present invention will be described below in more detail with reference to the accompanying drawings. In the following description, the suffixes module and unit are used in reference to components of the electronic device for convenience of description and do not have meanings or functions different from each other.

The electronic devices described herein may include mobile devices such as a cellular phone, a smart phone, a laptop computer, a digital broadcasting terminal, a personal digital assistant (PDA), a portable multimedia player (PMP), and a navigation system. And the electronic devices describes herein may includes non-mobile electronic devices such TV, personal computer. However, the present invention is not limited to the types of electronic devices described above.

FIG. 1 is a block diagram of a electronic device 100 in accordance with an embodiment of the present invention. The electronic device 100 can include a radio communication unit 110, an audio/video (A/V) input unit 120, a user input unit 130, a sensing unit 140, an output unit 150, memory 160, an interface 170, a controller 180, and a power supply 190. The components shown in FIG. 1 are not essential parts and the number of components included in the electronic device can be varied.

The components of the electronic device will now be described.

The radio communication unit 110 can include at least one module that enables radio communication between the electronic device 100 and a radio communication system or between the electronic device 100 and a network in which the electronic device 100 is located. For example, the radio communication unit 110 can include a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of combination of a TV broadcasting signal and a radio broadcasting signal.

The broadcasting related information can be information on a broadcasting channel, a broadcasting program or a broadcasting service provider. The broadcasting related information can be provided even through a mobile communication network. In this case, the broadcasting related information can be received by the mobile communication module 112.

The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB- S), media forward link only (MediaFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and receiving of text/multimedia messages.

The wireless Internet module 113 means a module for wireless Internet access and can be included in the electronic device 100 or externally attached to the electronic device 100. Wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 means a module for local area communication. Bluetooth, radio frequency identification (RFID), infrared data association (IrDA), ultra wideband (UWB) and ZigBee can be used as a local area communication technique.

The position information module 115 confirms or obtains the position of the electronic device. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time.

Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display module 151.

The image frames processed by the camera 121 can be stored in the memory 160 or transmitted to an external device through the radio communication unit 110. The electronic device 100 can include at least two cameras according to constitution of the terminal.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the terminal from a user. The user input unit 130 can include a keypad, a dome switch, a touch pad (constant voltage/capacitance), jog wheel, jog switch and so on.

The sensing unit 140 senses the current state of the electronic device 100, such as open/close state of the electronic device 100, the position of the electronic device 100, whether a user touches the electronic device 100, the direction of the electronic device 100 and acceleration/deceleration of the electronic device 100 and generates a sensing signal for controlling the operation of the electronic device 100. For example, the sensing unit 140 can sense whether a slide phone is opened or closed when the electronic device 100 is the slide phone. And the sensing unit 140 can sense a change of the position of the electronic device 100, a movement of the electronic device or a gesture of the user using a gesture detecting sensor 141. Furthermore, the sensing unit 140 can sense whether the power supply 190 supplies power and whether the interface 170 is connected to an external device. The sensing unit 140 can include a proximity sensor.

The output unit 150 generates visual, auditory or tactile output and can include the display module 151, an audio output module 152, an alarm module 153 and a haptic module 154.

The display module 151 displays information processed by the electronic device 100. For example, the display module 151 displays UI or graphic user interface (GUI) related to a telephone call when the electronic device is in the call mode. The display module 151 displays a captured or/and received image, UI or GUI when the electronic device 100 is in the video telephony mode or the photographing mode.

The display module 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display. The rear structure of the display module 151 can also be of the light transmission type. According to this structure, a user can see an object located behind the body of the electronic device 100 through an area of the body of the electronic device 100, which is occupied by the display module 151.

The electronic device 100 can include at least two display modules 151 according to constitution of the terminal. For example, the electronic device 100 can include a plurality of displays that are arranged on a single face at a predetermined distance or integrated. Otherwise, the plurality of displays can be arranged on different sides.

In the case where the display module 151 and a sensor sensing touch (referred to as a touch sensor hereinafter) form a layered structure, which is referred to as a touch screen hereinafter, the display module 151 can be used as an input device in addition to an output device. The touch sensor can be in the form of a touch film, a touch sheet and a touch pad, for example.

The touch sensor can be constructed such that it converts a variation in pressure applied to a specific portion of the display module 151 or a variation in capacitance generated at a specific portion of the display module 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

The touch sensor may be implemented using proximity sensor located in an internal region of the electronic device, surrounded by the touch screen, or near the touch screen. The proximity sensor senses an object approaching a predetermined sensing face or an object located near the proximity sensor using electromagnetic force or infrared rays without having mechanical contact. The proximity sensor has lifetime longer than that of a contact sensor and has wide application.

The proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this case, the touch screen (touch sensor) can be classified as a proximity sensor.

For convenience of explanation, an action of approaching the pointer to the touch screen while the pointer it not being in contact with the touch screen such that location of the pointer on the touch screen is recognized is referred to as proximity touch and an action of bring the pointer into contact with the touch screen is referred to as contact touch in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, and a proximity touch moving state). Information corresponding to the sensed proximity touch action and proximity touch pattern can be displayed on the touch screen.

The audio output module 152 can output audio data received from the radio communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) that are performed in the electronic device 100. The audio output module 152 can include a receiver, a speaker, a buzzer, etc.

The alarm module 153 outputs a signal for indicating generation of an event of the electronic device 100. Examples of events generated in the electronic device include receiving of a call signal, receiving of a message, input of a key signal, input of touch, etc. The alarm module 153 can output signals in forms different from video signals or audio signals, for example, a signal for indicating generation of an event through vibration. The video signals or the audio signals can be also output through the display module 151 or the audio output module 152.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The electronic device 100 can include at least two haptic modules 154 according to a constitution of the electronic device.

The memory 160 can store a program for the operation of the controller 180 and temporarily store input/output data (for example, phone book, messages, still images, and moving images). The memory 160 can store data about vibrations and sounds in various patterns, which are output from when a touch input is applied to the touch screen.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The electronic device 100 can operate in relation to a web storage performing the storing function of the memory 160 on the Internet.

The interface 170 serves as a path to all external devices connected to the electronic device 100. The interface 170 receives data from the external devices or power and transmits the data or power to the internal components of the electronic device 100 or transmits data of the electronic device 100 to the external devices.

The interface 170 can include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating the authority to use the electronic device 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the electronic device 100 through a card slot included in the interface 170.

The controller 180 controls the overall operation of the electronic device. For example, the controller 180 performs control and processing for voice communication, data communication and video telephony. The controller 180 can include a multimedia module 181 for playing multimedia. The multimedia module 181 can be included in the controller 180 or separated from the controller 180.

The controller 180 can perform a pattern recognition process capable of recognizing handwriting input or picture-drawing input applied to the touch screen as characters or images.

The power supply 190 receives external power and internal power and provides power required for the operations of the components of the electronic device under the control of the controller 180.

The power supply 190 can receive power from a wireless charging device in accordance with a magnetic induction method and charge the battery 195 with the received power. The power supply 190 may charge the battery 195 in normal charging mode or in fast charging mode.

The power receiver 200 of the power supply 190 can generate a charging voltage for the battery 195 based on the pick-up power from the wireless charging device. The controller 180 can control the pick-up power from the wireless charging device by controlling the impedance of one or more elements, related to magnetic induction in the power receiver 200, depending on charging mode and control the charging speed of the battery 195 based on the controlled pick-up power. A charging operation on the battery 195 of the power supply 190 is described in detail later with reference to FIGS. 2 to 14.

Various embodiments of the inventive concept can be implemented in a computer or similar device readable recording medium using software, hardware or a combination thereof, for example.

According to hardware implementation, the embodiments of the inventive concept can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

FIG. 2 is a flowchart illustrating an example of a method of driving an electronic device according to the present invention. The method of driving an electronic device is now described with reference to necessary drawings.

If a message drafting application is executed, the electronic device 100 displays a message drafting GUI (Graphic User Interface) on the display unit 151 (S100). Here, the message may be an SMS (Short Message Service), MMS (Multimedia Message Service), IMS (Instant Message Service), or e-mail message. However, the present invention is not limited thereto.

Next, the controller 180 of the electronic device 100 drafts a message based on a user's manipulation through the message drafting GUI, and a slideshow adding function may be activated in the drafted message (S110). Then, the user may generate a slideshow file based on the message drafted through the message drafting GUI. Hereinafter, the slideshow file generated based on the drafted message is referred to as message slideshow.

The message drafting GUI may include, basically, a simple message drafting GUI and a received message drafting GUI. The message drafting GUI may include various GUIs for generating a message slideshow by adding a slideshow function in the drafted message.

FIG. 3 shows an example of a message drafting GUI provided from an electronic device 100 according to the present invention.

The message drafting GUI includes a message input window 151A, a virtual keyboard 151B, and a function button area 151C. Such configuration is similar to a regular message drafting GUI. An add file button 151C1 or a send message button 151C2 displayed on the function button area 151C are also provided by the regular message drafting GUI. However, a button 151C3 of the message drafting GUI for providing a slideshow function to a drafted message may be a unique GUI of the present invention. A function of configuring a slideshow as provided based on the manipulation of the button 151C3 is described below in more detail with other drawings.

Turning back to FIG. 2, in the state where a slideshow adding function is activated in the message drafting GUI, the controller 180 recognizes a user's selection on part of the message drafted though the message drafting GUI and may set, on the receiving side, an output order on the part selected based on the user's manipulation through the message drafting GUI (S130).

The controller 180 then recognizes the user's selection on the part of the message drafted through the message drafting GUI and may set, on the receiving side, an output speed on the part selected based on the user's manipulation through the message drafting GUI (S140).

The controller 180 then generates a message slideshow whose output order and speed on the receiving side have been set on the selected part by the user, based on the user's message drafting complete manipulation and transmits the message slideshow to the receiving side (S140).

An example of setting an output order and speed on part of a drafted message on the receiving side has been described in connection with FIG. 2. However, the electronic device 100 may also generate a message slideshow whose output order and speed on the receiving side are set on the whole message that is drafted based on the user's manipulation.

An example of generating a message slideshow by setting an output order and speed on the receiving side on a drafted message has been described thus far. However, the electronic device 100 according to the present invention may function to add a visual effect to a drafted message, . . . with multimedia files other than the drafted message . . . in addition to the above-described functions.

FIG. 4 shows an example in which a slideshow adding function is activated in an electronic device 100 according to the present invention.

FIG. 4(a) shows an example in which in the state where "100", part of a drafted message, is selected, a button 151C3 for activating a slideshow adding function provided through a message drafting GUI is touched by a user. Then, the controller 180 of the electronic device 100 may activate the slideshow adding function as shown in FIG. 4(b).

Referring to FIG. 4(b), the controller 180 may further display a slideshow function adding region 151D that is a GUI for adding a slideshow function to the selected part in the message drafting GUI. In the slideshow function adding region 151D are included a first button 151D1 for setting an output order of the selected part on the receiving side, a second button 151D2 for setting a speed of the selected part on the receiving side, and a third button 151D3 for setting a visual effect of the selected part on the receiving side. However, the slideshow functions provided through the slideshow function adding area are not limited thereto.

FIG. 5 shows an example of a GUI for setting an output order on the receiving side among slideshow adding functions provided by an electronic device 100 according to the present invention.

FIG. 5(a) shows an example where a user selects part of a drafted message and then touches a button 151D1 for setting an output order on the selected part on the receiving side. Then, the controller 180 of the electronic device 100 may display, on the display unit 151, a GUI 151E for setting an order in which the part of the drafted message is to be output.

Referring to FIG. 5(b), the GUI 151E includes a button 151E1 that enables the part of the drafted message to be set to be first output on the receiving side and a button 151E2 that enables the part of the drafted message to be set to be output last. Meanwhile, methods of setting an order in which the selected part of the drafted message is to be output on the receiving side are not limited thereto.

FIG. 6 shows an example in which a message slideshow with an output order for part of a drafted message set, generated in an electronic device 100 according to the present invention is output by a receiving terminal 200.

In the message slideshow, the drafted message is the message shown in FIG. 3, and the "100" part in the drafted message is set to be output last. Then, the receiving terminal, as shown in FIG. 6(a), outputs the remaining part except the "100" part whose output order has been set and then may output the "100" part whose output order is set to be last may be output as shown in FIG. 6(b).

At this time, the part whose output order is not set separately may be immediately displayed in whole on the screen, or according to the order in which a message is drafted, may be sequentially displayed.

FIGS. 7 and 8 show example GUIs that are provided to generate a message slideshow which has set an output speed of a message drafted in an electronic device 100 according to the present invention.

FIG. 7(a) and FIG. 8(a) show an example in which in the state where part of a drafted message is selected, a user chooses a button 151D2 for setting a speed in a GUI 151D provided when a slideshow adding function is activated. Then, the controller 180 of the electronic device 100 may provide a GUI (151G or 151F) as shown in FIG. 7(b) or FIG. 8(b).

Referring to FIG. 7(b), the GUI 151F may be seen to be able to increase or decrease the output speed of the drafted message on the receiving side based on the speed in which the message is drafted. For example, if the user selects a first button 151F1 on the GUI 151F, the output speed of the message slideshow is set to be equal to the message drafting speed.

The user may set the output speed of the message slideshow to be faster or slower than the message drafting speed by selecting other buttons 151F2 and 151F3. Depending on the number of times or time of selecting the buttons, the degree of increase/decrease in the output speed may be set differently. More specifically, the degree of increase in the output speed of the message slideshow may be larger when the speed increasing button is touched twice by the user than when the speed increasing button is touched once.

Setting the output speed of the message slideshow may be fulfilled with respect to the whole drafted message. Such setting of the output speed may also be performed on part of the message. In such case, a different speed on the receiving side may be set to apply to each part of the drafted messaged.

Referring to FIG. 8(b), it can be seen that a user may indirectly set an output speed of a message slideshow on the receiving side by adjusting a button 151G1 for setting an output speed of a drafted message on the receiving side and then setting an output speed. Meanwhile, the output time of the message slideshow on the receiving side may mean the output time of the whole drafted message.

Further, referring to FIG. 8(b), a user may adjust a button 151G2 for selecting part of a drafted message for setting a speed, and then may select part of the drafted message, then may set an output time on the receiving side only for the selected part. In such case, a different output time (resultantly output speed) may be set to apply to each part in the drafted message.

FIGS. 9 and 10 show an example GUI 151D4 for setting a password for outputting, on the receiving side, part of a message drafted in an electronic device 100 according to the present invention.

FIG. 9 shows a state where a "100" part is selected in the drafted message, and a button 151D4 is then selected for setting a password on the selected part. The controller 180 of the electronic device 100, as illustrated in FIG. 10, may display a GUI (151D5 and 151D6) for setting a password on the display unit 151. A user may then generate a message slideshow in which a password has been set for the selected part "100."

In case the message slideshow is output on the receiving side, the "100" part with the password set in, only when a recipient should enter the password, may be displayed by the receiving terminal. Meanwhile, in such case, the password should be previously arranged between the drafter of the message slideshow and the recipient.

FIG. 11 is a flowchart illustrating another example method of driving an electronic device according to the present invention. A method of driving an electronic device is hereinafter described with reference to necessary drawings.

While a message is being drafted, a slideshow adding function is activated (S200). The controller 180 of the electronic device 100 then provides a GUI for setting an additional function to the display unit 151. The GUI includes a GUI for adding an image to the message that is being drafted.

A user activates an image additional function through the GUI (S210). Then, the user performs manipulation for adding the image to the message that is being drafted. Then, the controller 180 sets the added image as background of a message slideshow (S220). Here, as a method of adding the image to the message that is being drafted, an image stored in the storage unit 160 of the electronic device 100 may be called and added. The image stored in the storage unit 160 may include a video, as well as a still image.

Meanwhile, as a method of adding the image to the message that is being drafted, an image may be captured by the camera 121 of the electronic device 100 and may be added. The image captured by the camera 121 may be a still image or a video. However, methods of adding the image to the message that is being drafted are not limited thereto.

Thereafter, the generation of the message slideshow is complete, and the message slideshow is transmitted to the receiving side (S230). Then, the received message slideshow may be output from the receiving side, with the added image set as background.

In the embodiment described above in connection with FIG. 11, the image that is being drafted has been set as background of the message slideshow finally generated. However, the image that is being drafted is not set only as background of the message slideshow. For example, the electronic device 100 may form the image that is added mid drafting the message as part of the message. Like the image included in the document that is being drafted, the added image becomes part of the message that is being drafted.

FIG. 12 shows an example in which an image-added message slideshow is generated by a method of driving an electronic device as shown in FIG. 11. In the embodiment referring to FIG. 12, assume that the added image is set as background of the message slideshow.

FIG. 12(*a*) illustrates the state in while an additional function remains activated in the electronic device 100, a button 151D7 is selected for adding an image captured by the camera 121 to a message that is being drafted. The camera-looking icons 151A1 and 151A2 included in the message as shown in FIG. 12(*a*) represent that a picture is taken while a message is drafted and is added to the message.

Meanwhile, the picture taking mid message drafting can be performed by a user selecting the button 151D7 or pressing a separate hardware button. However, such picture taking may be automatically carried out when a predetermined condition is met. For example, in case information on a specific circumstance is recognized, such as when a specific word is included in the message that is being drafted, when one sentence is complete, or when a change in the user's look is noticed, the picture taking may be automatically conducted.

If a message is completely drafted (that is, when a message slideshow is completely generated), the user may transmit the message slideshow to the receiving side. As shown in FIG. 12(*b*), a GUI 151D8 may be provided to select whether the drafted message is to be output alongside the picture added at the receiving side.

FIG. 13 shows an example in which a message slideshow generated by a method of driving an electronic device as shown in FIG. 11 is output by a receiving terminal.

FIG. 13(*a*) illustrates an example in which in case the message slideshow is output by the receiving terminal 200, a captured image 251A1 is provided as background of the message slideshow. The image is output as background of the message slideshow after the time corresponding to "I am hungry", which is the time the picture was taken during the message drafting.

The image 251A1 may be output as background of message slideshow until, as shown in FIG. 13(*b*), an image 251A2 captured after the message drafting is complete is displayed as background at the end of the message slideshow.

FIG. 14 shows another example where an image is added to a message that is being drafted by a method of driving an electronic device as shown in FIG. 12.

FIG. 14(*a*) illustrates an example where a user touches a button 151D9 for performing an image adding function while a slideshow adding function is activated during message drafting. Then, the controller 180 of the electronic device 100 may provide, through the display unit 151, a GUI 151D10 for adding to the message being drafted a still image or video stored in the storage unit 160 of the electronic device 100. Then, the user may add the image to the message being drafted by manipulating the GUI 151D10.

FIG. 15 is a flowchart illustrating another example method of driving an electronic device according to the present invention. Hereinafter, the method of driving an electronic device is described with reference to necessary drawings.

If, while a message being drafted is partially selected (S300), a slideshow adding function is activated (S310), the controller 180 of the electronic device 100 provides through the display unit 151 a GUI for setting an output style for the selected message part (S320). The output style that may be set to the message part may include flashing, highlighting, underscoring, size adjusting, color adjusting, etc. However, the present invention is not limited thereto.

The GUI provided, a user sets a specific output style for the part of the message selected through the GUI (S330) and then finally completes the generation of the message slideshow, then may deliver the generated message slideshow to the receiving side (S340).

FIG. 16 shows an example of setting an output style for part of a message selected by a method of driving an electronic device as shown in FIG. 15.

FIG. 16(*a*) illustrates an example where, while a message is drafted and the "hungry" part of the message is selected, a slideshow adding function is activated, and a user touches a button 151D11 for setting an output style of the selected part on the receiving side.

Then, the controller 180 of the electronic device 100 may provide through the display unit 151 a GUI 151D12 that may offer various visual effects to the selected part (that is, so as to enable an output style to be set) as shown in FIG. 16(*b*).

Meanwhile, although not shown, the electronic device 100 according to the present invention may also provide a sound additional function for a user's voice or ambient sound mid message drafting. Then, the added sound may be set as background sound of a message slideshow.

Further, the electronic device 100 according to the present invention may provide a preview function for a drafted slideshow. Then, a user may identify the state of output of a message slideshow and may check what needs to be compensated or modified.

FIGS. 17 and 18 show an example where a message slideshow is generated by an electronic device 100 according to the present invention and is output by a receiving terminal 200.

FIG. 17(*a*) illustrates an example where a user touches a transmission button with message drafting complete. Then, the controller 180 provides through the display unit 151 a GUI 151H for selecting whether to generate a message slideshow added with a function of sequentially outputting a message drafting process on the receiving side and transmit the generated message slideshow.

If a user selects "yes" in the GUI 151H, then the controller 180 may generate a message slideshow of sequentially outputting a message drafting process and transmitting the generated message slideshow to the receiving side. However, if the user selects "no" in the GUI 151H, then the controller 180 may transmit a simple message with no slideshow function added to the receiving side.

Meanwhile, the function of adding a slideshow function to a drafted message is not activated only by selecting the transmission button. For example, the electronic device 100 may also activate the slideshow adding function for a drafted message based on selection of a hardware button or a soft key provided through the screen.

FIG. 18(*a*) illustrates an example of, when a message slideshow drafted as shown in FIG. 17 is received and output, providing a GUI 251B for selecting whether the receiving terminal 200 is to output the message slideshow as a slideshow or simple message.

If a user selects "yes" in the GUI 251B, then the receiving terminal 200 outputs a message slideshow that sequentially outputs a message drafting process as shown in FIG. 18(*b*).

FIGS. 19 and 20 show another example where a message slideshow is generated by an electronic device 100 according to the present invention and is output through a receiving terminal 200.

FIG. 19(*a*) illustrates an example where, while message drafting is complete, a user touches a transmission button.

The controller 180 then provides through the display unit 151 a GUI 151I for selecting whether to generate a message slideshow added with a function of sequentially outputting a message drafting process on the receiving side and transmitting the generated message slideshow as shown in FIG. 19(b).

If the user selects "yes" in the GUI 151I, then the controller 180 may generate a message slideshow that sequentially outputs a message drafting process and transmit the generated message slideshow to the receiving side. However, if the user selects "no" in the GUI 151H, then the controller 180 may send to the receiving side a simple message with no slideshow function added.

FIG. 20(a) illustrates an example of, when the message slideshow drafted as shown in FIG. 19 is received and output, providing a GUI 251C for selecting whether the receiving terminal 200 is to output the message slideshow as a slideshow or a simple message.

If a user selects "yes" in the GUI 251C, then the receiving terminal 200 outputs a message slideshow that sequentially outputs a message drafting process as shown in FIG. 20(b).

Meanwhile, it can be seen that according to the embodiments described in connection with FIGS. 19 and 20, the electronic device 100 according to the present invention may provide a message drafting function using a user's directly made scribble or drawings, as well as a message drafting function based on entry using, e.g., a virtual keyboard.

Each of the above-described methods of driving an electronic device may be implemented in the form of a program that may be executed by various computing means and may be recorded in a computer-readable medium. The computer-readable medium may include, alone or in combination, a program command, a data file, and a data structure. The program recorded in the medium may be one specially designed and configured for the present invention or one known and available to those of ordinary skill in the computer software industry.

Examples of a computer-readable recording medium may include magnetic media such as a hard disk, a floppy disk, and a magnetic tape; optical media such as CDROM and DVD; magneto-optical media such as floptical disk; and hardware devices such as ROM, RAM, and flash memory specially constructed to store and carry out program commands. Examples of a program may include high-level language codes which can be executed by a computer using an interpreter as well as assembly codes such as those generated by a compiler. The hardware device can be so constructed as to be operated by one or more software modules to carry out operation of the present invention and vice versa.

As described above, although the present invention has been described by a limited number of embodiments and drawings, the present invention is not limited by the embodiments. Rather, those skilled in the art to which the present invention belongs will be able to achieve various modifications from the disclosed embodiments.

Therefore, the scope of the present invention should not be limited by the embodiments described above but should be defined by appended claims and equivalents of the claims.

INDUSTRIAL APPLICABILITY

The present invention may be adopted for various electronic devices that may offer a slideshow function to a drafted message, thereby delivering a drafter's feel or sentiment that comes while drafting a message, in addition to a mere drafting and checking of a message.

The invention claimed is:
1. An electronic device comprising:
a communication unit;
a display unit configured to provide a message drafting GUI (Graphic User Interface) that enables drafting a message and adding a slideshow function to the drafted message; and
a controller configured to:
generate a message slideshow with an output order and an output speed on at least a part of the drafted message on a receiving side based on manipulation of the message drafting GUI, and
transmit the message slideshow to the receiving side through the communication unit,
wherein the message drafting GUI includes a GUI that enables increasing/decreasing an output speed of the drafted message on the receiving side based on a drafting speed of the drafted message.

2. The electronic device of claim 1, wherein the controller sets a different output speed of the message slideshow on the receiving side for each part selected in the drafted message based on the manipulation of the message drafting GUI.

3. The electronic device of claim 1, wherein the message drafting GUI includes a GUI for setting a time when the slideshow is output at the receiving side.

4. The electronic device of claim 1, wherein the controller sets an image added while drafting the message as a background of the message slideshow.

5. The electronic device of claim 4, wherein the controller sets the added image as a background of the message slideshow from a time when the image is added to a time when another image is added to the message while the message is drafted.

6. The electronic device of claim 4, wherein the controller performs image capturing when a predetermined condition is met while the message is drafted and sets the captured image as a background of the message slideshow.

7. The electronic device of claim 1, wherein the message drafting GUI further includes a GUI for setting an output style for the selected part of the drafted message on the receiving side.

8. A method of controlling an electronic device, the method comprising:
providing a message drafting GUI (Graphic User Interface) that enables drafting a message and adding a slideshow function to the drafted message;
generating a message slideshow with an output order and an output speed on at least a part of the drafted message on a receiving side based on manipulation of the message drafting GUI; and
transmitting the message slideshow to the receiving side through the communication unit,
wherein the message drafting GUI includes a GUI that enables increasing/decreasing an output speed of the drafted message on the receiving side based on a drafting speed of the drafted message.

9. The method of claim 8, wherein setting an output speed on the receiving side includes setting a different output speed of the message slideshow on the receiving side for each part selected in the drafted message based on the manipulation of the message drafting GUI.

10. The method of claim 8, wherein the message drafting GUI includes a GUI for setting a time when the slideshow is output at the receiving side.

11. The method of claim 8, further comprising setting an image added while drafting the message as a background of the message slideshow.

12. The method of claim 11, wherein setting the image added while the message is drafted as the background of the message slideshow includes setting the added image as a background of the message slideshow from a time when the image is added to a time when another image is added to the message while the message is drafted.

13. The method of claim 11, wherein setting the image added while the message is drafted as the background of the message slideshow includes performing image capturing when a predetermined condition is met while the message is drafted and setting the captured image as a background of the message slideshow.

14. The method of claim 8, wherein the message drafting GUI further includes a GUI for setting an output style for the selected part of the drafted message on the receiving side.

\* \* \* \* \*